United States Patent
Lee

(10) Patent No.: US 7,117,392 B2
(45) Date of Patent: Oct. 3, 2006

(54) IMAGE RECORDING/REPRODUCING APPARATUS FOR SYSTEM OPTIMIZATION

(75) Inventor: Chang-rok Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 602 days.

(21) Appl. No.: 10/628,458

(22) Filed: Jul. 29, 2003

(65) Prior Publication Data

US 2004/0153784 A1    Aug. 5, 2004

(30) Foreign Application Priority Data

Aug. 17, 2002    (KR)    ............... 10-2002-0048731

(51) Int. Cl.
*G06F 11/00*    (2006.01)
(52) U.S. Cl. ..................... 714/24; 714/22
(58) Field of Classification Search ........... 714/21, 714/22, 24, 36; 360/5
See application file for complete search history.

(56) References Cited

U.S. PATENT DOCUMENTS

| | | | |
|---|---|---|---|
| 5,717,934 A * | 2/1998 | Pitt et al. ............... | 713/330 |
| 6,044,157 A * | 3/2000 | Uesaka et al. ............ | 380/201 |
| 6,134,071 A * | 10/2000 | Andoh et al. ............. | 360/75 |
| 6,263,453 B1 * | 7/2001 | Anderson ................. | 714/22 |
| 6,459,624 B1 * | 10/2002 | Kuo ..................... | 365/185.33 |
| 2002/0141580 A1 * | 10/2002 | Okuyama ................. | 380/201 |
| 2004/0136694 A1 * | 7/2004 | Iwasaki et al. ............ | 386/95 |

FOREIGN PATENT DOCUMENTS

JP    10-027116    1/1998

* cited by examiner

*Primary Examiner*—Scott Baderman
*Assistant Examiner*—Joshua Lohn
(74) *Attorney, Agent, or Firm*—Roylance, Abrams, Berdo & Goodman, L.L.P.

(57) ABSTRACT

An image recording/reproducing apparatus includes a first device for reproducing data from a recording medium, a second device for recording the data reproduced by the first device, a data maintenance unit for controlling the operation of the first and the second devices, a power supply unit for supplying a power to the first and the second devices, a power control unit for controlling operation of the power supply unit, an error data detecting unit for detecting an error data among the data recorded in the second device, and a main control unit, which, upon receiving a power cut-off command, controls the data maintenance unit to stop the operation of the second device and delete the error data detected by the error data detecting unit. Then, with the deletion of the error data, the main control unit controls power control unit so that the power supply unit cuts off the power supply. With the input of the power-off command, error data is detected among the data recorded in the recording space of the hard disc drive and deleted. Accordingly, the system is always maintained at an optimum state.

20 Claims, 5 Drawing Sheets

IMAGE RECORDING/REPRODUCING APPARATUS FOR SYSTEM OPTIMIZATION

CROSS REFERENCE TO RELATED APPLICATIONS

This application claims benefit under 35 U.S.C. § 119 from Korean Patent Application No. 2002-48731, filed on Aug. 17, 2002, the entire content of which is incorporated herein by reference.

BACKGROUND OF THE INVENTION

1. Field of the Invention

The present invention generally relates to an image recording/reproducing apparatus, and more particularly, it relates to an image recording/reproducing apparatus having a first and second devices located in one casing and wherein, the image recording/reproducing apparatus is capable of maintaining the system in stable state in the event of power loss, by searching and removing the data abnormally recorded in the second device.

2. Description of the Related Art

With the development of technologies of broadcasting signal digitalization and compression, image recording/reproducing apparatuses that record broadcasting signals on a recording medium and also reproduces such recorded data from the recording medium, are being designed with more functions.

Among such image recording/reproducing apparatuses, a combination type having a first and second device for performing independent functions has been marketed and is, provided with the function of reproducing audio/video (A/V) signals. For the purpose of present description, the combination type of image recording/reproducing apparatus having first and second devices therein will be referred to an image recording/reproducing apparatus.

FIG. 1 is a block diagram schematically showing a DVD/HDD image recording/reproducing apparatus having a DVD-ROM and a hard disc drive (HDD) in one casing.

As shown in FIG. 1, the DVD/HDD image recording/reproducing apparatus 10 includes a DVD-ROM 12 and a hard disc drive (HDD) 14 combined in one casing. The DVD-ROM 12 reproduces data from a recording medium, and HDD 14 records data and reproduces recorded data. While the DVD-ROM 12 and the HDD 14 function independently, they also communicate via an interface which is capable of transmitting and receiving data of both DVD-ROM 12, and HDD 14. Generally, the DVD-ROM 12 reproduces data of optical disc recording medium such as a digital video disk (DVD), audio compact disk (CD), video CD and MP3 CD.

The DVD/HDD image recording/reproducing apparatus 10 can receive external broadcasting signals, and record the received data on the HDD 14 and output the recorded data externally. Further, the DVD/HDD image recording/reproducing apparatus 10 can output to external devices data such as externally-received broadcasting signals, data reproduced from the DVD-ROM 12, and data reproduced from the HDD 14. The DVD/HDD image recording/reproducing apparatus 10 outputs the broadcasting signals and data to corresponding devices such as audio amp 15, TV 17 and camcorder 19 in accordance with the characteristics of the output. Further, the DVD/HDD image recording/reproducing apparatus 10 can record on the HDD 14 the data reproduced from the audio amp 15, the TV 17 and the camcorder 19.

The DVD/HDD image (or feature) recording/reproducing apparatus 10 is additionally provided with the function of recording externally-input data on the HDD 14, in addition to the data reproduced from the DVD-ROM 12.

However, in recording the data on the HDD 14 of the DVD/HDD image recording/reproducing apparatus 10, there are instances in which unnecessary or abnormally-recorded data are recorded. For example, the DVD/HDD image recording/reproducing apparatus 10 cannot process data in a format which is different than the formats acceptable to the HDD 14. Accordingly, such data in the unacceptable format occupies space on the HDD 14, minimizing efficient space utilization of storage capacity. This is an example of unnecessary data.

In another instances, data may be missing from the HDD 14 even while there is a list of the data in the recording space of HDD 14. In this situation, as reproducing is performed with respect to the HDD 14 to reproduce the list of data, error occurs in the DVD/HDD image recording/reproducing apparatus 10, causing the system to stop the entire operation.

Furthermore, deleting data that unnecessarily occupies recording space on the HDD 14, causes great inconvenience to the user because he/she is required to search the recording space of HDD 14 and check the data as searched.

SUMMARY OF THE INVENTION

An object of the present invention is to substantially solve at least the above problems and/or disadvantages and to provide at least the advantages described below.

Accordingly, it is an object of the present invention to provide a method for maintaining data integrity in an image recording/reproducing apparatus, wherein the method comprises the steps of receiving a power off command, stopping reproducing and recording in response to the power-off command, and detecting and deleting error data when the reproducing and recording is stopped.

It is a further object of the invention to provide an image recording/reproducing apparatus for system optimization comprising a first storage device for reproducing data from a recording medium, a second storage device for recording the data reproduced by the first device, a data maintenance unit for controlling the operation of the first and the second devices, an error data detecting unit for detecting an error data among the data recorded in the second storage device and a main control unit, which, upon receiving a power cut-off command, controls the data maintenance unit to stop the operation of the second storage device and delete the error data detected by the error data detecting unit.

BRIEF DESCRIPTION OF THE DRAWINGS

The above object and other features of the present invention will become more apparent by describing in detail a preferred embodiment thereof with reference to the attached drawings.

DETAILED DESCRIPTION OF THE PREFERRED EMBODIMENT

Figure 1:
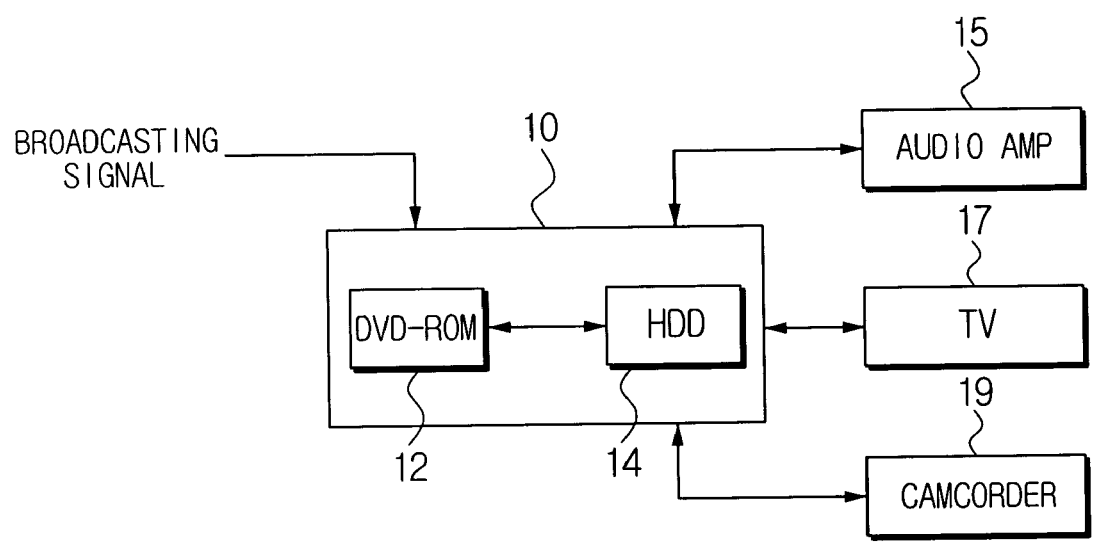
FIG. 1 is a block diagram schematically illustrating a DVD/HDD image recording/reproducing apparatus having a DVD-ROM and a hard disc drive (HDD) combined in one casing.
Figure 2:
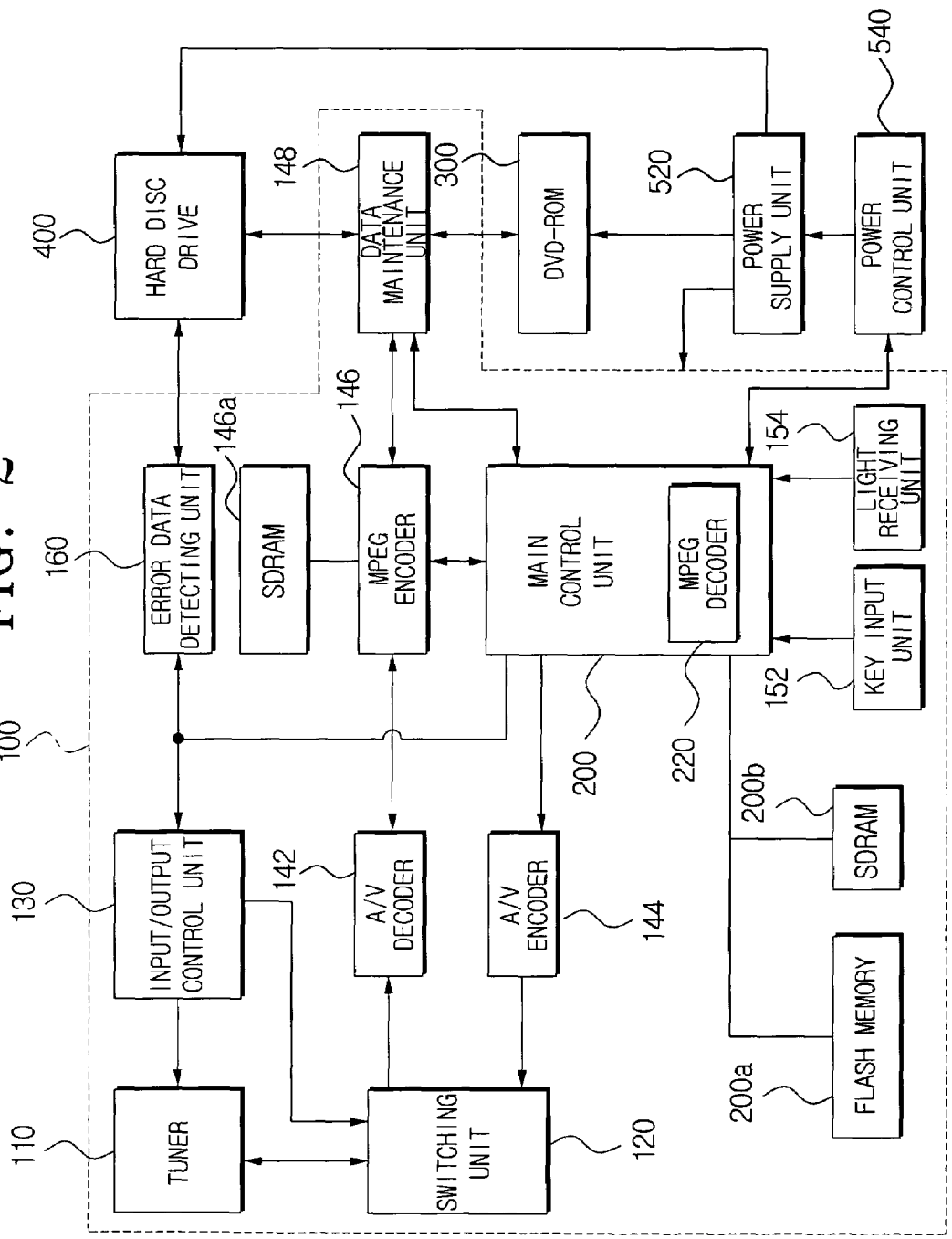
FIG. 2 is a block diagram illustrating an image recording/reproducing apparatus for system optimization according to an embodiment of the present invention.

Hereinafter, the present invention will be described in detail with reference to the accompanying drawings. FIG. 2 is a block diagram illustrating an image recording/reproducing apparatus according to an embodiment of the present invention. More specifically, FIG. 2 shows a DVD/HDD image recording/reproducing apparatus by way of one example of the image recording/reproducing apparatus of the present invention.

Referring to FIG. 2, the DVD/HDD image recording/reproducing apparatus includes a signal processing unit 100 having a DVD-ROM 300, a hard disc drive (HDD) 400 and a main control unit 200, a power supply unit 520 and a power control unit 540.

The DVD-ROM 300 reproduces data from optical disc recording mediums such as DVD, audio CD, video CD and MP3 CD. The DVD-ROM 300 can also record externally-input data on the optical disc recording mediums.

HDD 400 records the externally-input data and reproduces the recorded data. HDD 400 in this embodiment is configured with a data format that can be recorded in, and reproduced from, the recording space of the HDD 400. One example of a data format that can be recorded in, and reproduced from, the recording space of the HDD 400 is MPEG data. MPEG data includes motion picture data, MP3 data and JPEG data, i.e., the image data. However, as one skilled in the art can appreciate, data format recordable in the recording space of the HDD 400 can vary depending on the operational characteristic of the system.

Under the control of the main control unit 200, the signal processing unit 100 controls the operations related to the data recording and reproducing of the DVD-ROM 300 and the HDD 400, and encodes and decodes the externally-received data.

The power supply unit 520 converts the externally-fed power to voltages of predetermined levels and supplies the voltages to corresponding parts such as the DVD-ROM 300, the HDD 400 and the signal processing unit 100 for operation thereof. The power control unit 540 controls operations related to power supply of the power supply unit 520.

The DVD/HDD image recording/reproducing apparatus according to an embodiment of the present invention is constructed to receive at least one kind of image signal from the image sources. The image sources can be mediums such as terrestrial television broadcasting, satellite broadcasting, cable lines, computer lines or model lines that can transmit signals. In other words, the DVD/HDD image recording/reproducing apparatus can be constructed to receive at least one kind of signal, from a cable, satellite dish, local cable, digital broadcast source (DBS), general antenna, Internet, other computer source, camcorder, disc player, and set-top box, as well as other sources as one skilled in the art can appreciate.

Signal processing unit 100 includes a tuner 110, a switching unit 120, an A/V decoder 142, an A/V encoder 144, an MPEG encoder 146, a data maintenance unit 148 and a main control unit 200, as well as other well known components.

The tuner 110 adjusts reception channels so that the broadcasting signals can be tuned to the channel requested by an input/output control unit 130, which is controlled by the main control unit 200.

The switching unit 120 is controlled by the input/output control unit 130, and selectively connects input/output terminals (not shown) with any external A/V input/output devices.

The A/V decoder 142 decodes the audio/video signals received through the switching unit 120 and outputs them to the MPEG encoder 146. The A/V decoder 142 is controlled by the main control unit 200.

The A/V encoder 144 encodes the data MPEG-decoded at the MPEG decoder 220 of the main control unit 200, and the audio/video signal decoded at the A/V decoder 142, and outputs the encoded data to the switching unit 120.

The MPEG encoder 146 is controlled by the main control unit 200, to encode the audio/video signals outputted from the A/V decoder 142 in accordance with a predetermined compression format, and stores the data to be recorded in a large-capacity storage device, i.e., in the HDD 400. Preferably, the motion picture data is encoded in accordance with MPEG-2 compression. Reference numeral 146a refers to a SDRAM employed as a memory for encoding process at the MPEG encoder 146.

The data maintenance unit 148 performs maintenance on the reproducing and recording of the data with respect to the HDD 400 and/or DVD-ROM 300. The data maintenance unit 148 is controlled by the main control unit 200, to perform the maintenance of recording of the recorded data from the DVD-ROM 300 to the HDD 400, or recording of the recorded data from the HDD 400 to the DVD-ROM 300, or the recording of the encoded data from the MPEG encoder 146 to the HDD 400.

The key input unit 152 is provided as an interface, and comprises manipulation keys through which a user can select a command. Accordingly, the user manipulation signals selected through the key input unit 152 are output to the main control unit 200. The light receiving unit 154 is also provided as an interface which receives user manipulation signals from external input devices such as remote controller and outputs the signals to the main control unit 200. According to this embodiment, the key input unit 152 and the remote controller are provided with manipulation keys through which power of the DVD/HDD image recording/reproducing apparatus is turned on/off.

The main control unit 200 processes the user manipulation signals received through the key input unit 152 and the light receiving unit 154, and accordingly controls the respective components. The main control unit 200 is provided as a single chip type of IC in this example, in which the MPEG decoder 220 for decoding the compressed signal in MPEG format is combined with a central processing unit (CPU). However, the main control unit 200 can be alternatively configured as multiple components. Further, with reception of a power-off command through the key input unit 152 and the light receiving unit 154, the main control unit 200 controls the power control unit 540 to cut off the power supply of the power supply unit 520.

An operation program of the main control unit 200 is recorded in a flash memory 200a. The flash memory 200a is provided with a menu guide/process unit which perform a processes to display a menu guide list on a screen. Reference numeral 200b refers to a SDRAM, which is used as a temporary recording space by the main control unit 200.

In operation, the main control unit 200 processes the operation of various functions in accordance with the commands received through the key input unit 152 and the light receiving unit 154, by loading the programs installed in the flash memory 200*a*.

In this embodiment, the DVD-ROM 300 reproduces the MPEG data recorded on the optical disc recording medium. The HDD 400 records the MPEG data from the MPEG encoder 146 and the DVD-ROM 300 and reproduces the recorded data in accordance with the control of the data maintenance unit 148.

The DVD/HDD image recording/reproducing apparatus according to an embodiment of the present invention is provided with an error data detecting unit 160 that searches the data recorded in the recording space for the error data which is abnormally recorded. The error data detecting unit 160 performs error data searching with respect to the data recorded in the recording space of the HDD 400 in accordance with the control of the main control unit 200.

When a power-off command is received from the key input unit 152 or the light receiving unit 154 to the DVD/HDD image recording/reproducing apparatus in operation, the main control unit 200 controls the power control unit 540 so that the power supply unit 520 cuts off power supply to the components except the main control unit 200 and the HDD 400. The main control unit 200 also controls the data maintenance unit 148 to maintain the HDD 400 in a stopped state so that the recording and reproducing operation of the HDD 400 is stopped. Such a stopped state of the HDD 400 is called an 'idle' state.

The main control unit 200 then controls the error data detecting unit 160 to detect the error data among the data recorded in the recording space of the HDD 400, while the HDD 400 is maintained in the idle state by the control of the data maintenance unit 148. As the error data detecting detects the error data among the data recorded in the recording space of the HDD 400, the detected information is provided to the main control unit 200.

The main control unit 200 controls the data maintenance unit 148 to delete the error data on the recording space of the HDD 400 corresponding to the detection information provided from the error data detecting unit 160. The data maintenance unit 148 controls the HDD 400 to delete the error data from the recording space. Accordingly, the HDD 400 deletes the data corresponding to the deletion command transmitted from the data maintenance unit 148.

Upon completion of the data deletion on the HDD 400 in accordance with the deletion command, the data maintenance unit 148 transmits the information to the main control unit 200, notifying that the deletion is completed. The main control unit 200, when receiving the information notifying the completion of error data deletion, controls the power control unit 540 to cut off the power supply output from the power supply unit 520. Accordingly, the power control unit 540 controls the power supply unit 520 to cut off all the power supply, and by the power cut off of the power supply unit 520, the power of the DVD/HDD image recording/reproducing apparatus is turned off.

Several examples of methods for error detection by error data detecting unit 160 will now be discussed.

In a first method, the error data detecting unit 160 can consider the data as error data if the data is in a format that is unacceptable to the recording space of the HDD 400, i.e., if the data is other than motion picture data, MP3 data and image data.

In a second method, the error data detecting unit 160 can consider the data of an acceptable format as the error data if there is no data information existing with respect to the data because it is impossible to reproduce the data.

In a third method, the error data detecting unit 160 can consider an empty folder, i.e. a folder without data in acceptable format existing therein, as the error data.

Accordingly, the system can always be maintained at an optimum state even with the input of a power-off command, by detecting the error data among the data on the recording space of the HDD 400 and deleting the error data before the power-off. Further, since the data optimization is performed after the input of power-off command, the user is not required to do any manipulation for the deletion of the error data.

Figure 3:
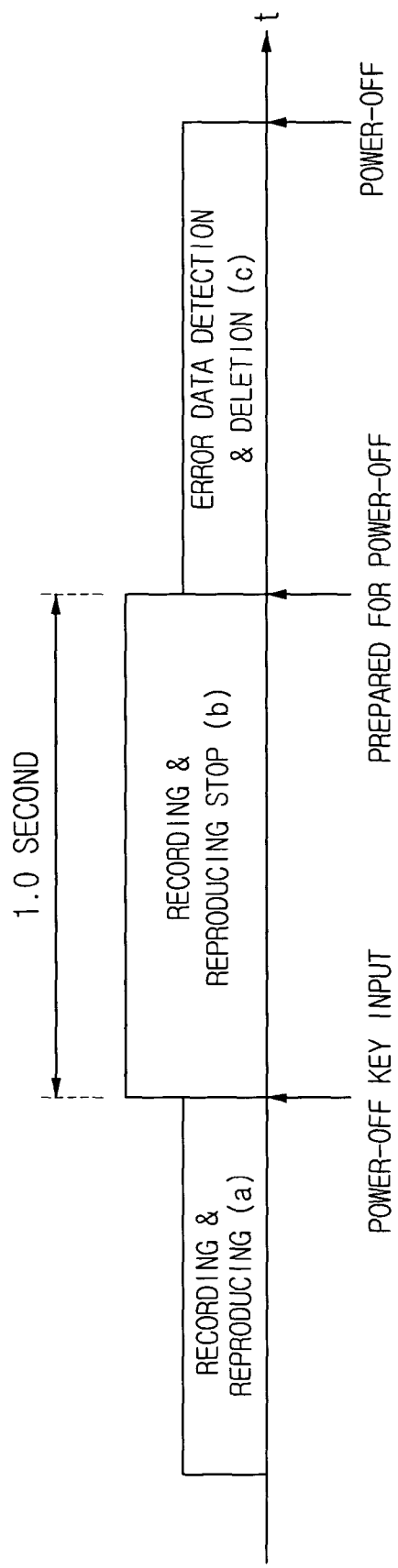
FIG. 3 is a time line illustrating error data being erased along a temporal axis, upon reception of power-off command input in accordance with an embodiment of the invention.

FIG. 3 is a time-line illustrating a first example of deletion of error data in the temporal axis (t), which is performed upon input of power-off command.

When a power-off command is received from the manipulation of a power-off key during the recording/reproducing operation (a) of the HDD 400, the HDD 400 stops (b) recording/reproducing in accordance with the control of the data maintenance unit 148 that receives the command from the main control unit 200. The time designated for the HDD 400 to stop (b) the recording/reproducing operation may vary depending on the design, but in this example, it is set to be 1.0 second.

As the HDD 400 stops (b) recording/reproducing operation, the main control unit 200 is prepared for the power-off that uses the power supply unit 520. Simultaneously, the error data detecting unit 160 and the HDD 400 detect and delete (c) the error data among the recorded data of the recording space in accordance with the commands received by the main control unit 200 and the data maintenance unit 148. Upon completion of the error data detection and deletion (c), the main control unit 200 transmits the power-off command to the power control unit 540. Accordingly, the power supply unit 520 cuts off all the power supply in accordance with the controlling of the power control unit 540.

Figure 4:
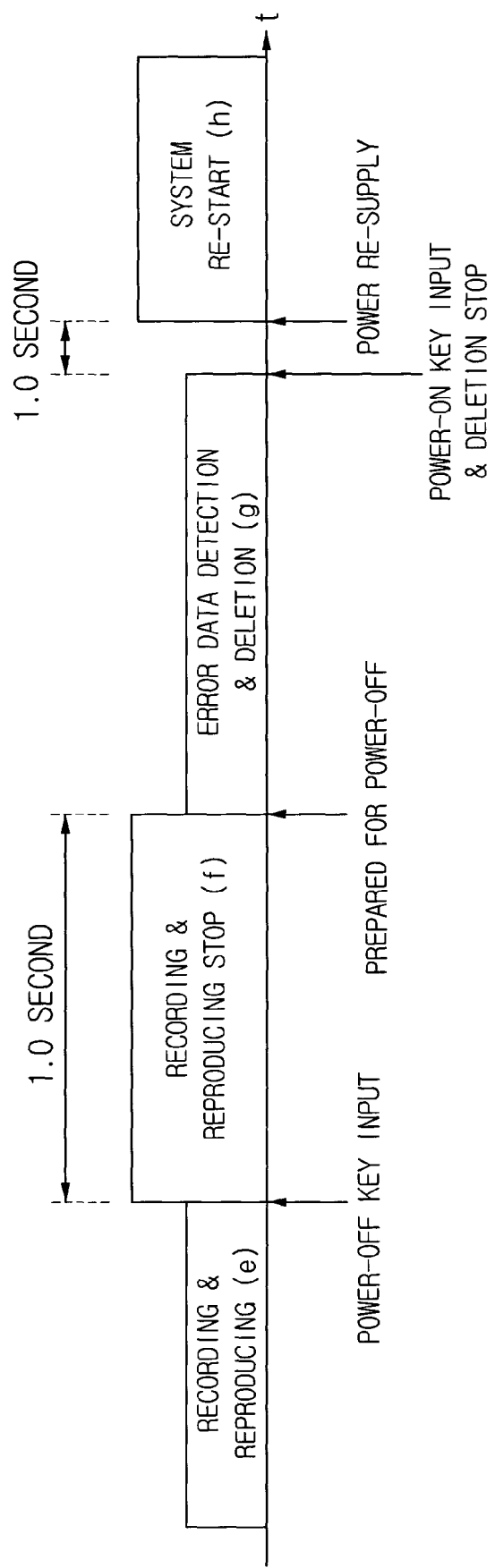
FIG. 4 is a time line illustrating error data being erased along a temporal axis upon reception of power-off command input in accordance with a further embodiment of the invention and FIG. 5 is a flowchart illustrating an example of a method for system optimization using the DVD/HDD image recording/reproducing apparatus according to an embodiment of the present invention.

FIG. 4 is a time-line illustrating another example of deleting error data in the temporal axis (t) in accordance with the input of the power-off command.

When a power-off command is received from the manipulation of a power-off key during the recording/reproducing operation (e) of the HDD 400, the HDD 400 stops (f) recording/reproducing in accordance with the control of the data maintenance unit 148 that receives the command from the main control unit 200. The time for the HDD 400 to stop (f) the recording/reproducing operation is set to be 1.0 second in this embodiment.

As the HDD 400 stops (f) recording/reproducing, the main control unit 200 is preparing to implement a power-off command utilizing the power supply unit 520. Simultaneously, the error data detecting unit 160 and the HDD 400 detect and delete (g) the error data of the recorded data on the recording space of HDD 400 in accordance with commands from the main control unit 200 and the data maintenance unit 148.

Then, when a power-off command is received from the manipulation of a power-off key during the error data detection/deletion (g) of the HDD 400, the main control unit 200 controls the error data detecting unit 160 and the data maintenance unit 148 to stop the detection/deletion (g) of the error data. The main control unit 200 also controls the power control unit 540 so that the power supply is resumed and the operation of the DVD/HDD image recording/reproducing apparatus is re-started. At this time, the main control unit 200 allocates a pause period between the stop of the detection/deletion of error data (g) and power re-supply. In this example, the pause period is set to be 1.0 second, though use of other pause periods are possible. In accordance with the commands transmitted by the power control unit 540, the power supply unit 520 re-supplies the power to the DVD/ HDD image recording/reproducing apparatus, whereby the DVD/HDD image recording/reproducing apparatus is re-booted, i.e., re-started (h). Thus, system optimization occurs durign the time period the system is not used by the user.

Figure 5:
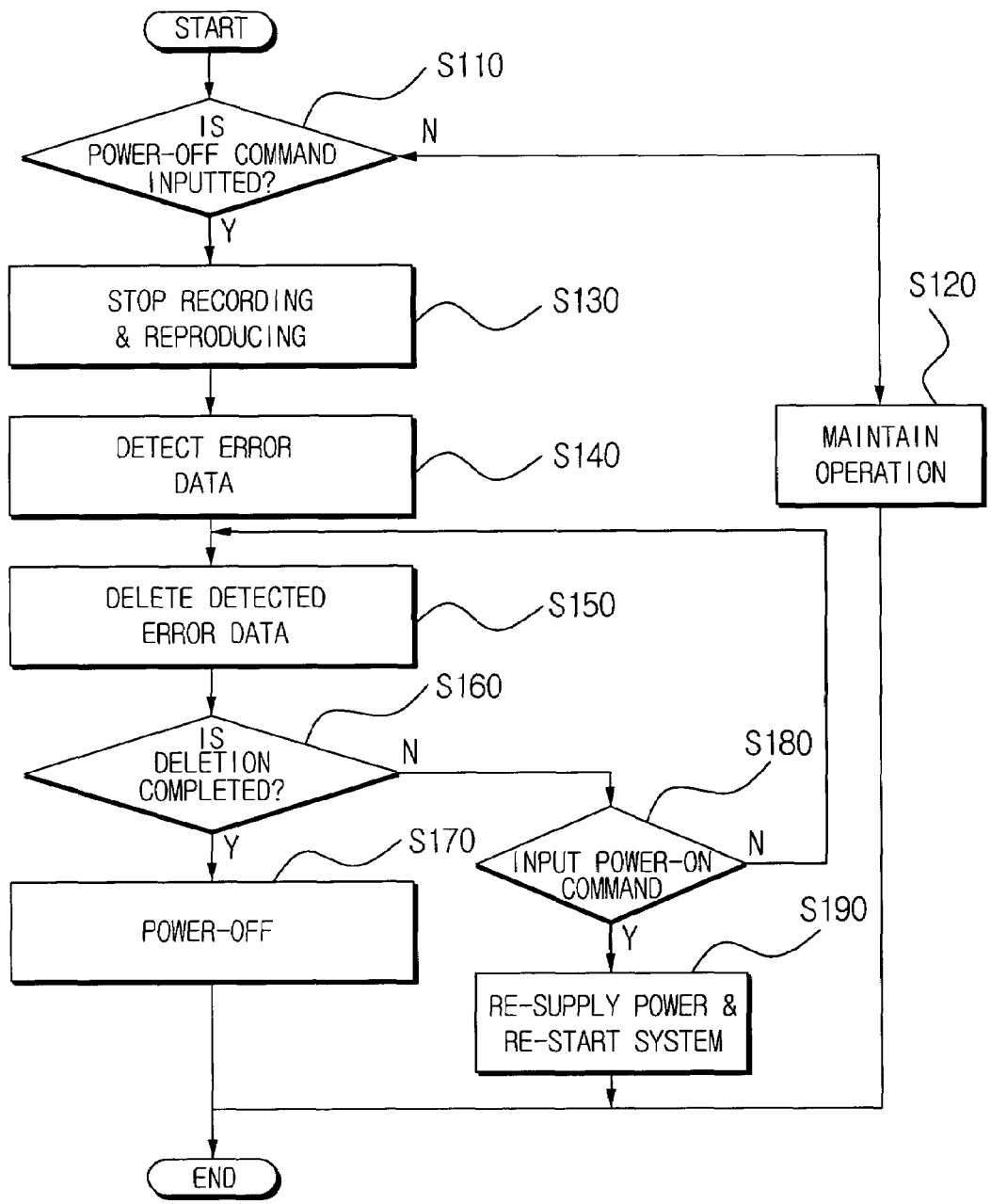

FIG. 5 is a flowchart illustrating a method of system optimization using the DVD/HDD image recording/reproducing apparatus according to the preferred embodiment of the present invention.

The method illustrated in FIG. 5 begins with step S110, in which, the main control unit 200 determines whether the power-off command has been received from either the key input unit 152 or the light receiving unit 154 or not (decision step S110). Upon determining that the power-off command has not been received ("No" path from decision step S110), the main control unit 200 controls the respective blocks in operation so as to maintain the current state (step S120).

Upon determining that the power-off command has been received (from either the key input unit 152 or the light receiving unit 154) in decision step S110 ("Yes" path from decision step S110), the main control unit 200 controls the data maintenance unit 148 so that HDD 400 stops recording/reproducing operation (step S130). Accordingly, the data maintenance unit 148 controls the HDD 400 to stop the data recording/reproducing operation, and the HDD 400 stops the recording/reproducing operation in accordance with the commands from the data maintenance unit 148.

With the recording/reproducing operation of the HDD 400 stopped, the main control unit 200 controls the error data detecting unit 160 to detect the error data among the recorded data of the recording space of the HDD 400 (step S140). Accordingly, the error data detecting unit 160 detects the error data in the recording space of the HDD 400, and transmits the detected information to the main control unit 200.

The main control unit 200 issues a command to the data maintenance unit 148, which then issues its own command to HDD 400, causing it to delete the error data in accordance with the information transmitted from the error data detecting unit 160 in regard to the error data (step S150). Accordingly, the HDD 400 deletes the error data of the recorded data of the recording space in accordance with the command from the data maintenance unit 148. At this time, the data maintenance unit 148 transmits to the main control unit 200 the information about the current state of the HDD 400 in error data deletion operation.

The main control unit 200 determines whether the deletion of the error data of the HDD 400 is completed or not, based on the information about current state of the HDD 400 transmitted from the data maintenance unit 148 (decision step S160). When it is determined that all the error data of the HDD 400 is deleted ("Yes" path from decision step S160), the main control unit 200 issues a command to the power control unit 540 commanding it to turn off the power supply unit 520, i.e., to turn off the power (step S170). Accordingly, the power supply unit 520 cuts off the power in accordance with the command from the power control unit 540, and thus the DVD/HDD image recording/reproducing apparatus is turned off.

If, however, data deletion is still in process ("No" path from decision step S160), the main control unit 200 determines whether the power-on command is input through either the key input unit 152 or the light receiving unit 154 (decision step S180). When it is determined that the power-on command has not been received ("No" path from decision step S180), the main control unit 200 issues a command to the data maintenance unit 148 forcing it to continuously perform the deletion (S150) of error data on HDD 400.

If the main control 200 determines that the power-on command has been received ("Yes" path from decision step S180), the main control unit 200 issues a command to the power control unit 540 resulting in the power supply unit 520 re-supplying the power (step S190). Accordingly, the power supply unit 520 re-supplies the power in accordance with the command from the power control unit 540, and the DVD/HDD image recording/reproducing apparatus is re-booted, thereby being re-started.

Since the error data is deleted using the time that is not used by the user, i.e., within the time when the power-off command is inputted, the DVD/HDD image recording/reproducing apparatus can always be maintained at an optimum state.

According to the embodiments of the present invention discussed above, upon receipt of power-off command, error data is detected among the data recorded in the recording space of the HDD and such detected error data is deleted before the power-off. Accordingly, the system is always maintained at optimum state.

Further, since the data optimization is carried out after the input of the power-off command, i.e., within the time that is not used by the user, the user is not required to do any manipulation for the deletion of the error data.

Although a few embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. A method for maintaining data integrity in an image recording/reproducing apparatus, comprising:
   receiving a power off command;
   stopping reproducing and recording in response to the power-off command; and
   detecting and deleting error data when the reproducing and recording is stopped.

2. The method according to claim 1, further comprising:
   shutting off a power supply when the error data is deleted and no power on command has been received before the error data has been detected.

3. The method according to claim 1, further comprising:
   energizing the power supply when the error data has not been completely deleted and a power on command has been received.

4. The method according to claim 1, wherein the step of receiving a power off command comprises:
   receiving a power off command from either a key input or a light receiving unit.

5. The method according to claim 1, wherein the step of stopping reproducing and recording comprises:
   receiving a command issued by a main control unit to a data maintenance unit directing the data maintenance unit to stop reproducing and recording.

6. The method according to claim 1, wherein the step of detecting error data comprises:
   receiving at an error detection unit a command issued by a main control unit;
   operating the error detecting unit to detect error data, if any; and transmitting detected error data information to a main control unit.

7. The method according to claim 1, wherein the step of deleting error data comprises:
issuing a command from a main control unit to a data maintenance unit to delete error data;
deleting error data from a first storage device by direction of the data maintenance unit; and
transmitting current state of error data deletion information from the data maintenance unit to the main control unit.

8. The method according to claim 7, wherein the first storage device includes a hard disk drive.

9. The method according to claim 1, wherein the step of detecting error data comprises:
detecting error data if the data is in an unacceptable format.

10. The method according to claim 1, wherein the step of detecting error data comprises:
detecting error data if data information is missing with respect to the data.

11. The method according to claim 1, wherein the step of detecting error data comprises:
detecting error data if a folder contains no data.

12. An image recording/reproducing apparatus comprising:
a first storage device for reproducing data from a recording medium;
a second storage device for recording the data reproduced by the first device;
a data maintenance unit for controlling the operation of the first and the second devices;
an error data detecting unit for detecting an error data among the data recorded in the second storage device; and
a main control unit, which, upon receiving a power cut-off command, controls the data maintenance unit to stop the operation of the second storage device and delete the error data detected by the error data detecting unit.

13. The apparatus according to claim 12, wherein the first storage device includes a DVD-ROM.

14. The apparatus according to claim 12, wherein the second storage device includes a HDD.

15. The apparatus according to claim 12, further comprising:
at least one of a key input unit and a light receiving unit which can issue a power cut-off command.

16. The apparatus according to claim 12, further comprising:
a power supply unit for supplying a power to the first and the second devices.

17. The apparatus according to claim 12, further comprising:
a power control unit for controlling operation of the power supply unit.

18. The apparatus according to claim 12, wherein the first and second storage device reproduce and record data respectively according to a known storage format.

19. The apparatus according to claim 18, where in the known format is the MPEG-2 format.

20. The apparatus according to claim 12, wherein the error data detecting unit search data recorded in the recording space of the second storage device, and provides detected information to the main control unit.

* * * * *